United States Patent [19]

Montalto

[11] Patent Number: 5,283,420
[45] Date of Patent: Feb. 1, 1994

[54] ELECTRICALLY HEATED BEVERAGE CONTAINER

[76] Inventor: Bartolino P. Montalto, 35 Burns St., New Bedford, Mass. 02740

[21] Appl. No.: 660,690

[22] Filed: May 6, 1991

[51] Int. Cl.$^5$ .................... H05B 1/02; H05B 3/14; A47J 36/24
[52] U.S. Cl. .................... 219/432; 219/436; 219/438; 219/505; 219/530; 392/444
[58] Field of Search ............... 219/436, 438, 441, 442, 219/432, 433, 505, 530, 540; 392/444

[56] References Cited

U.S. PATENT DOCUMENTS

| 1,062,344 | 5/1913 | Mann. | |
| 3,813,517 | 5/1974 | McGruder | 219/438 |
| 4,341,949 | 7/1982 | Steiner | 219/441 X |
| 4,463,664 | 8/1984 | Peace | 219/433 X |

FOREIGN PATENT DOCUMENTS

| 231391 | 12/1960 | Australia | 219/441 |
| 63-24311 | 5/1988 | Japan | 219/438 |

Primary Examiner—Anthony Bartis

[57] ABSTRACT

A plastic drinking container and holding stand for maintaining a heated beverage at a suitable elevated drinking temperature includes a thin metallic cup-shaped insert having a positive temperature coefficient (PTC) ceramic heater affixed to the bottom wall thereof. An electrically non-conductive plastic sleeve encapsulates the insert and ceramic heater and has a thick outer shell with a thick bottom providing good thermal insulation characteristics and a film-like inner shell permitting rapid heat transfer from the metal insert to the beverage in the container. A pair of electrical contact pins extend into a linear groove on the bottom of the container for mating with spring contacts located between a pair of linear guides at the top of the holding stand and adapted to be received in the linear container groove. An upstanding tab on the stand engages a recess in the container groove to positively restrain the container against movement when mounted on the stand.

1 Claim, 1 Drawing Sheet

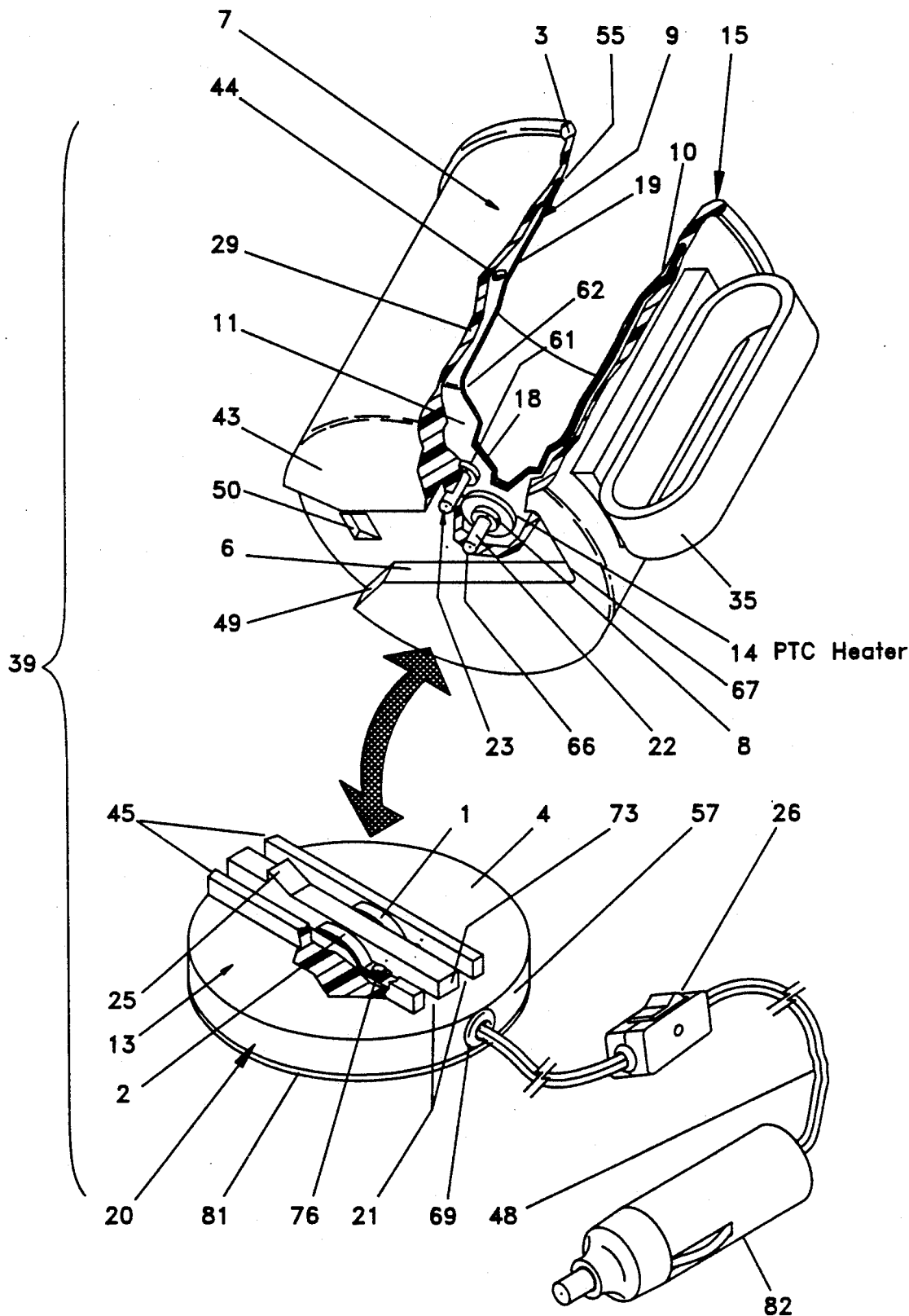

ELECTRICALLY HEATED BEVERAGE CONTAINER

BACKGROUND OF THE INVENTION

1. Technical Field of the Invention

This invention relates to an electrically heated container that accepts and thermally maintains a heated beverage when placed onto its mating holding stand.

2. Background Art

Hot beverages, such as coffee, are often consumed by people who drive to their destinations. Traffic delays and long traveling distances quickly convert an enjoyable warm beverage into a cold distasteful liquid. The heat of the beverage is given up to the ambient surroundings in what amounts to be a short period of time.

Prior art devices include insulated beverage receptacles and hot plates or warmers. Insulated receptacles simply prolong the heat dissipation process. They can elongate the period in which the beverage is considered enjoyable, but cannot maintain the original elevated beverage temperature. Hot plates introduce heat through the external bottom area of an insulated receptacle. This hot plate type of heating, however, is not effective in even heat distribution throughout the beverage.

In addition, they not only warm the bottom portion of the container, but also limit the type of container that can be placed onto them. Certain plastics and other low melting receptacle materials will deform or melt when they come in contact with a hot plate.

Therefore, a necessity exists in the art for an electrically heated beverage container to directly introduce heat to an already hot beverage contained therein.

SUMMARY OF THE INVENTION

Generally described, the present invention allows a heated beverage to be collected in a receptacle that is capable of maintaining the elevated temperature of the beverage. Stated somewhat more specifically, the container is comprised of a ceramic heater that is in direct contact with a thin, thermally conductive liner; including a bottom section, an upwardly extending wall section, and an open top section. An encapsulating sleeve surrounds the conductive liner and forms a thick insulating outer shell as well as a thin film-like inner shell.

The present invention includes a mating base that allows electricity to reach the ceramic heater which is encapsulated within the receptacle. This is achieved through a mating set of contacts. The base also acts as a tip resistant support allowing the receptacle to be temporarily mounted in a safe, upright position.

Accordingly, it is an object of the present invention to provide an improved beverage warming apparatus.

It is another object of the present invention to provide an insulated receptacle that includes a heat source and a thin metal liner to evenly dissipate heat along the wall of the receptacle.

Another object of the present invention is to complete an electrical circuit by means of mating contacts. This circuit can only be made when the receptacle properly rests on its supportive holding stand.

Another object of the present invention is to thermally maintain the beverage temperature at a predetermined level, not allowing the beverage to get too hot.

Another object of the present invention is the interfitting relation between the bottom of the heated receptacle and the holding stand. It provides tip resistant support and alignment of the electrical circuit.

Other objects, features, and advantages of the present invention will become apparent upon closer evaluation of the following specification, when taken in conjunction with the pictorial drawing.

BRIEF DESCRIPTION OF THE DRAWINGS

The sole view of the drawing is a pictorial illustration of a beverage warming apparatus including a cup and base with portions thereof cut-away for illustrative purposes, according to a disclosed embodiment of the invention. The base view has been rotated for ease of illustrative purposes.

DETAILED DESCRIPTION OF THE EMBODIMENT

Referring now in more detail to the drawing, the sole view of an electrically heated beverage container and holding stand (39) illustrates a cut away view exposing the internal components. The container (7) is designed to rest on the electrical contacts (1) and (2) of the holding stand (13) and is shown above the holding stand in the sole view. The container (7) includes a thermally and electrically conductive insert (9), preferably made of thin, solderable metal, such as copper or the like. The insert (9) is generally cup-shaped and includes a bottom portion (18), an up-wardly extending wall portion (19), and an open top portion (55). The bottom portion (9) of the insert has a positive temperature coefficient (PTC) ceramic heater (14) fastened in electrical contact with it, preferably by the means of soldering or the like. The heater (14) is generally disc shaped, however, may have other geometric configurations. Affixed to the bottom side (8) of the PTC heater (14), is an electrical contact (22). Mounted to the external side of the bottom portion of the insert (9) is another electrical contact (23). The contacts, (22) and (23), are preferably made of metal, such as brass or the like, having a flat base (61) and a thinner down-wardly extending prong (66).

Surrounding the insert (9) is a thermally insulating sleeve (15). The sleeve (15) is relatively rigid and electrically non-conductive. The sleeve (15) includes an outer shell (29) that extends down-wardly from an upper annular lip (3) at the open top portion of the container (7) to the external annular bottom (11) radius of the container (37) and an inner shell (10) that also extends down-wardly from the upper lip (3) to the internal annular bottom radius (18). The outer shell (29) serves as a thermal insulator as well as a scalding protector. The thin, film-like inner shell (10) coats the entire inner surface of the metal insert (9) and allows the heat to quickly reach the beverage.

The sleeve (15) is preferably a unitary article formed by molding or the like, so that the outer shell (29) and the inner shell (10) each extend downward from the upper annular lip (3).

A conventional handle (35) is molded or otherwise attached to the outer shell (29). It will be appreciated that the thermally conductive inert (9) preferably is permanently affixed to the unitary sleeve (15) by means of holes (44) through which the material, such as plastic or the like, comprising the sleeve (15) extends.

The bottom of the outer shell (29) radiuses inward, forming the bottom portion of the container (43). The bottom portion (43) includes an angled notch (49) which leads to a narrow linear notch (6). The container contacts, (22) and (23), extend down-wardly from the external side of the bottom portion of the insert (9) and the bottom side of the PTC heater (14), respectively, and protrude into the narrow linear notch (6). It is appreciated that the container contacts, (22) and (23), do not extend past the plane of the bottom portion of the container (43).

The holding stand (13) includes an annular base (20) having an up-wardly extending wall portion (57) and an upper face (4) with two linear guides (45) that extend up-wardly from the face (4). In between the linear guides (45) is a divider section (73) that also extends up-wardly from the upper face (4). An angled tab (25) extends up-wardly from the divider section (73) and mates with the notch (50) in groove (6), and the end wall of the notch (67) mates with the linear guides (45) and the divider section (73) to positively restrain the beverage container (7) from accidentally moving or electrically misaligning itself. Linear grooves (21) between the linear guides (45) the divider section (73) house the electrical contacts (1) and (2). A hole through the bottom of the groove (21) allows the contacts, and the incoming wire to be fastened by means of a rivet or the like. The spring type contacts (1) and (2) have a positive ,contacting force with their mating contacts (22) and (23). It is preferable that the contacts, do not extend past the plane of the upper face guides (45) and divider section (73). The base is enclosed by means of an adhesive material (81) that conforms to the shape of the base and that may also act as a non-slip bottom surface. The current conducting wires are attached to the rivets (76) in the bottom of the grooves (21) and pass through the opening (69) in the up-wardly extending wall portion (20) of the base. Power is controlled by a switch (26) of known design. Electricity is supplied to the holding stand (13) through known connector means (82) that are associated with household outlets, automobile cigarette lighters, and other such voltage sources.

Considering now the operation of the enclosed embodiment, a desired hot beverage such as coffee, or the like is poured into the container (7). The container (7) is then placed onto the holding stand (13), and electricity is then supplied to the heater (14) by turning on the in-line switch (26)associated with the power cord (48) and connector (82) leading to the heater (14) through a mating set of contacts (1), (2), (22), and (23). Heat from the heater (14) is applied directly to the bottom portion (18) of the metal insert (9) and this heat in turn is transmitted throughout the thin metal insert (9) and quickly dissipates inwardly through the film-like plastic inner shell (10) to thermally maintain the beverage previously placed in the container (7). It will be appreciated that the heat capacity of the PTC ceramic heater (14) be selected to provide only sufficient heat to maintain the desired consumption temperature of the hot beverage. The consumer can remove the container from the holding stand (13), drink the beverage, and then return it to the holding stand (13), allowing the process to start all over again. As the container (7) rests on the holding stand (13), heat from the heater (14) rises and dissipates inwardly, maintaining the desired beverage temperature. A lid (not shown) of known construction and design accompanies the container (7) and is used to further deter heat dissipation through the open end of the receptacle (7) as well as prevent spilling of the beverage.

While this invention has been described in detail with particular reference to a preferred embodiment thereof, it will be understood that the variations and modifications can be made within the spirit and the scope of the invention as described herein before and is defined in the following claims:

I claim:

1. An electrically heated container and holding stand for receiving and thermally maintaining a hot beverage consisting of the following: a cup-shaped container comprising, a self limiting, positive temperature coefficient generally disc shaped ceramic heater, a thin, thermally and electrically conductive insert which includes a bottom section, an upwardly extending wall section, and an open top section, said ceramic heater being mounted in electrical contact with the external side of the bottom portion of the said insert by means of soldering, electrical contact pins electrically affixed to the said external side of the bottom portion of the insert and to the bottom surface of said ceramic heater, an electrically nonconductive sleeve encapsulating the said insert, ceramic heater, and a portion of the electrical contacts, the sleeve being comprised of a thick outer shell having a thick bottom portion and a film-like inner shell which conforms to the shape of the said insert, the film-like inner shell permitting good heat transferring ability from the thin metal insert to a liquid beverage adapted to be received in the container, the film-like inner shell allowing a gradual and even heating of the beverage as not to burn the liquid, the thick outer shell providing good insulating characteristics as well as protecting the consumer from scalding themselves, the bottom portion of the thick outer shell including an angled groove that leads to a linear groove for guiding and positively restraining the container on a mating holding stand, the nonencapsulated portions of the contact pins protruding into the linear groove and without extending below the plane of the bottom portion of the thick outer shell, said linear groove being provided with a recess adapted to accept an upwardly extending tab on a holding stand and a mechanical stop, the recess and stop adapted to prevent the container from accidentally moving while mounted on the stand and insuring proper positioning of the contact pins relative to the stand, a holding stand for receiving said electrically heated container, comprising a base which includes a bottom portion and a wall portion that extends upwardly from the said bottom portion, an upper face joined to the wall portion as to support said heated container when it is placed onto it, parallel spaced apart linear guides extending upwardly from said upper face adapted to be received in said linear groove of said container for orienting the container, a divider section between said guides and defining a pair of linear grooves therebetween, said linear grooves each housing a spring contact adapted to electrically engage one of the contact pins of the container seated on the base, a hole extending from the bottom of each groove through to the interior of base for fastening said spring contacts and current conducting wires by means of a rivet, the current conducting wires attached to the spring contacts passing through a hole in the upwardly extending wall portion of the base and being controlled by an in-line switch that leads to a conventional power source connector, the grooves themselves being narrowly spaced to guard against any foreign object coming in direct touch with the electrical spring contacts, and an upwardly extending angular tab on said divider section adapted to engage the recess in said linear container groove for positively restraining the container against movement when mounted on the holding stand.

* * * * *